(12) United States Patent
Li et al.

(10) Patent No.: US 12,034,374 B2
(45) Date of Patent: Jul. 9, 2024

(54) METHOD OF SWITCHING OPERATIONAL MODES OF A POWER CONVERTER

(71) Applicant: Leadtrend Technology Corp., Hsinchu County (TW)

(72) Inventors: San-Yi Li, Hsinchu County (TW); Hung-Ting Hsu, Hsinchu County (TW); Jun-Hao Huang, Hsinchu County (TW); Hsin-Hung Lu, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 271 days.

(21) Appl. No.: 17/844,713

(22) Filed: Jun. 20, 2022

(65) Prior Publication Data

US 2023/0179101 A1 Jun. 8, 2023

Related U.S. Application Data

(60) Provisional application No. 63/287,089, filed on Dec. 8, 2021.

(51) Int. Cl.
*H02M 3/335* (2006.01)
*H02M 1/00* (2006.01)

(52) U.S. Cl.
CPC ..... *H02M 3/33507* (2013.01); *H02M 1/0032* (2021.05)

(58) Field of Classification Search
CPC ............ H02M 3/335; H02M 3/33507; H02M 3/33523; H02M 3/33569; H02M 3/33576; H02M 3/33592; H02M 1/0032
See application file for complete search history.

(56) References Cited

U.S. PATENT DOCUMENTS

| 2017/0155331 A1* | 6/2017 | Lee | H02M 3/33523 |
| 2018/0323722 A1* | 11/2018 | Chen | H02M 3/33523 |

* cited by examiner

*Primary Examiner* — Gary L Laxton
(74) *Attorney, Agent, or Firm* — Winston Hsu

(57) ABSTRACT

A method of switching operational modes of a power converter includes starting up a primary controller applied to the power converter to make the power converter operate in a normal mode; a secondary controller applied to the power converter detecting an output voltage of a secondary side of the power converter and the primary controller detecting an operational frequency of the power converter; if the operational frequency of the power converter is lower than a predetermined frequency and satisfies a first frequency condition, the primary controller controlling the power converter to enter a sleep mode; and when the power converter enters the sleep mode and the output voltage is lower than a trigger voltage, the secondary controller making the primary controller to control the power converter turned on.

10 Claims, 6 Drawing Sheets

METHOD OF SWITCHING OPERATIONAL MODES OF A POWER CONVERTER

CROSS REFERENCE TO RELATED APPLICATIONS

This application claims the benefit of U.S. Provisional Application No. 63/287,089, filed on Dec. 8, 2021. The content of the application is incorporated herein by reference.

BACKGROUND OF THE INVENTION

1. Field of the Invention

The present invention relates to a method of switching operational modes of a power converter, and particularly to a method that can significantly reduce power consumption of the power converter when the power converter operate in no load, and accelerate response of the power converter corresponding to dynamic change of a load connected to the power converter.

2. Description of the Prior Art

In the prior art, although a primary controller applied to a primary side of a flyback power converter can make an operational frequency of the flyback power converter reduced to reduce power consumption of the flyback power converter when the flyback power converter has no load (or light load). However, meanwhile because the operational frequency of the flyback power converter is still hundreds of hertz, the power consumption of the flyback power converter still cannot be significantly reduced.

In addition, after the flyback power converter operate in a normal mode, when a load connected to the flyback power converter is dynamically changed, although the primary controller can make the operational frequency of the flyback power converter changed with variety of the load, the primary controller does not respond fast enough to the variety of the load, so the operational frequency of the flyback power converter does also not respond fast enough to the variety of the load, resulting in the flyback power converter not meeting specifications for some applications.

Therefore, how to improve the above-mentioned shortcomings of the prior art has become an important issue for the future development of the flyback power converter.

SUMMARY OF THE INVENTION

An embodiment of the present invention provides method of switching operational modes of a power converter, wherein a primary controller and a secondary controller are applied to the power converter. The method includes starting up the primary controller to make the power converter operate in a normal mode; the secondary controller detecting an output voltage of a secondary side of the power converter and the primary controller detecting an operational frequency of the power converter; if the operational frequency of the power converter is lower than a predetermined frequency and satisfies a first frequency condition, the primary controller controlling the power converter to enter a sleep mode; and when the power converter enters the sleep mode and the output voltage is lower than a trigger voltage, the secondary controller making the primary controller control the power converter to be turned on.

The present invention provides a method of switching operational modes of a power converter. The method utilizes communication between a primary controller applied to the power converter and a secondary controller applied to the power converter to make the power converter enter a sleep mode and an operational frequency of the power converter substantially reduced to reduce power consumption of the power converter when the power converter operates in no load, and make the power converter enter the a response mode when a load connected to the power converter is dynamically changed. Therefore, compared to the prior art, the present invention not only can substantially reduce the power consumption of the power converter when the power converter operates in no load, but can also accelerate response of the power converter corresponding to dynamic change of the load connected to the power converter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
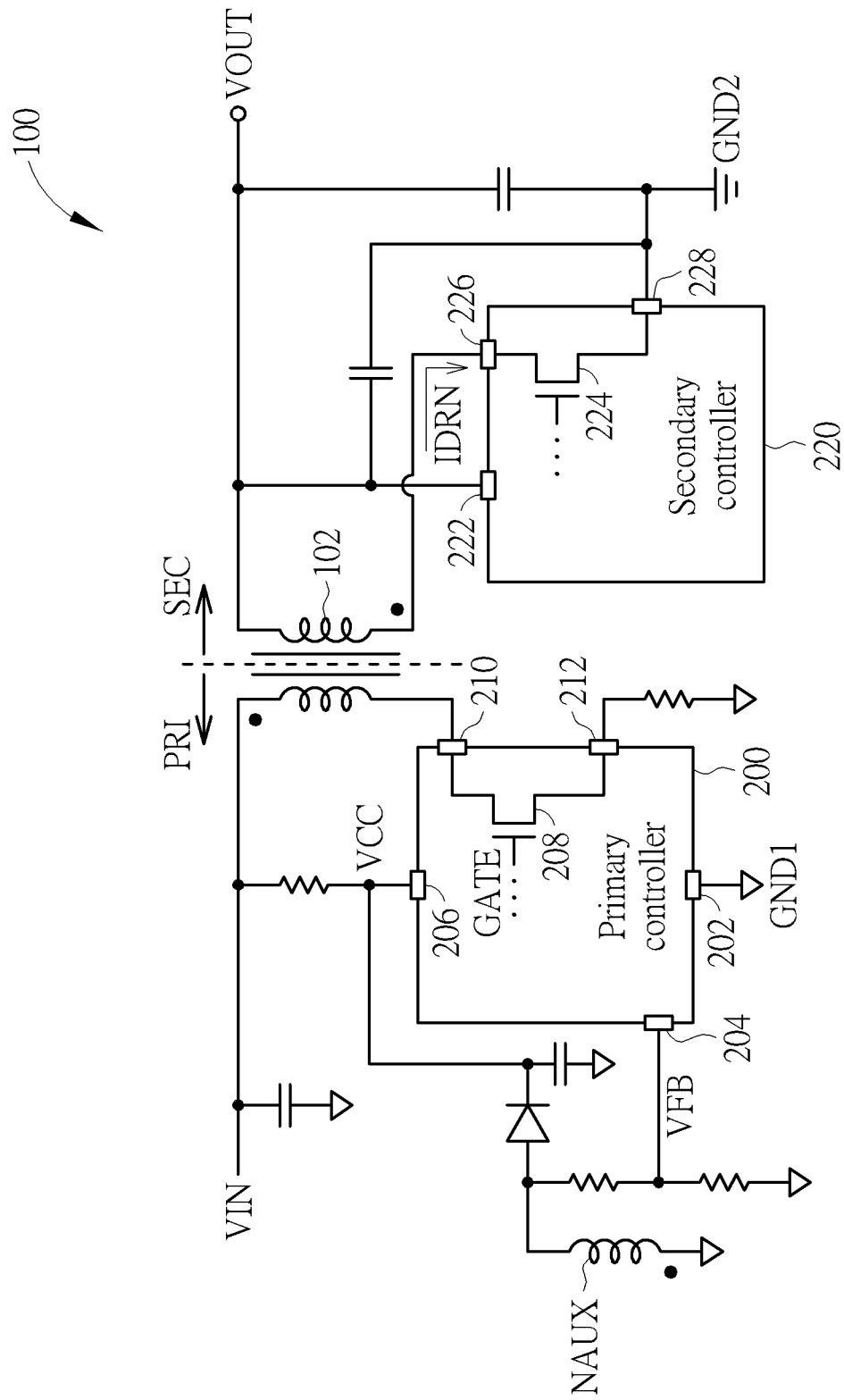
FIG. 1 is a diagram illustrating a power converter, and a primary controller and a secondary controller applied to the power converter according to a first embodiment of the present invention.

Please refer to FIG. 1. FIG. 1 is a diagram illustrating a power converter 100, and a primary controller 200 and a secondary controller 220 applied to the power converter 100 according to a first embodiment of the present invention. As shown in FIG. 1, the power converter 100 is a flyback power converter, the primary controller 200 is applied to a primary side PRI of the power converter 100, and the secondary controller 220 is applied to secondary side SEC of the power converter 100. In addition, for simplifying FIG. 1, FIG. 1 neglects pins of the primary controller 200 except a pin 202 of the primary controller 200 connected to ground GND1, a pin 204 of the primary controller 200 receiving a feedback voltage VFB, a pin 206 receiving a supply voltage VCC, and pins 210, 212 coupled to a power switch 208, and also neglects pins of the secondary controller 220 except a pin 222 receiving an output voltage VOUT and pins 226, 228 coupled to a synchronous switch 224, wherein the output voltage VOUT further acts as a supply voltage of the secondary controller 220. In addition, for simplifying FIG. 1, only the power switch 208 is shown in the primary controller 200, and only the synchronous switch 224 is shown in secondary controller 220. In addition, potential of the ground GND1 is different from potential of ground GND2.

Figure 2:
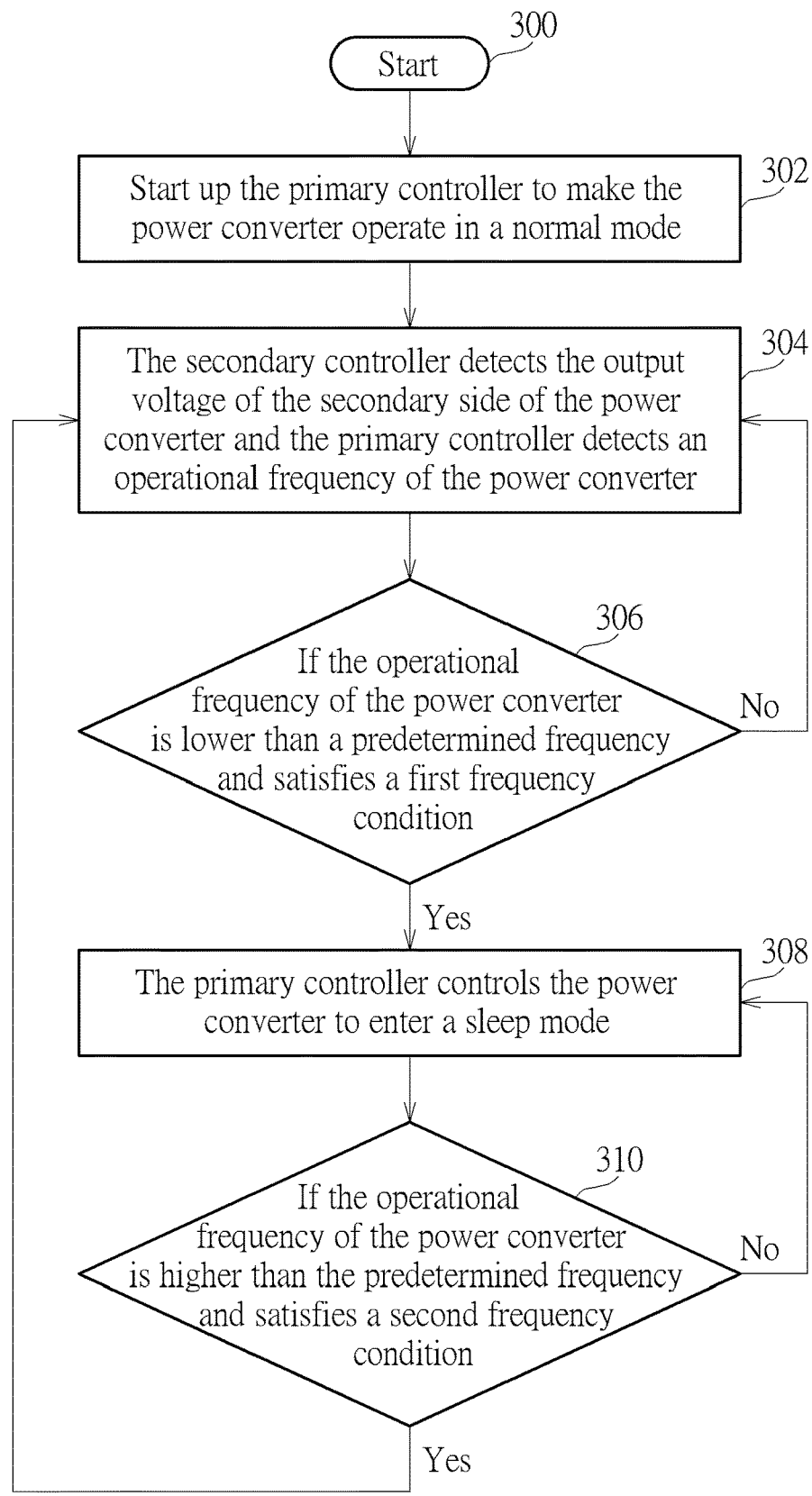
FIG. 2 is a flowchart illustrating a method of switching operational modes of a power converter according to a second embodiment of the present invention.

Please refer to FIG. 2. FIG. 2 is a flowchart illustrating a method of switching operational modes of a power converter according to a second embodiment of the present invention. The method in FIG. 2 is illustrated using the power converter 100, the primary controller 200, and the secondary controller 220 in FIG. 1. Detailed steps are as follows:

Step 300: Start.

Step 302: Start up the primary controller 200 to make the power converter 100 operate in a normal mode.

Step 304: The secondary controller 220 detects the output voltage VOUT of the secondary side SEC of the power converter 100 and the primary controller 200 detects an operational frequency of the power converter 100.

Step 306: If the operational frequency of the power converter 100 is lower than a predetermined frequency and satisfies a first frequency condition; if yes, go to Step 308; if no, go to Step 304.

Step 308: The primary controller 200 controls the power converter 100 to enter a sleep mode.

Step 310: If the operational frequency of the power converter 100 is higher than the predetermined frequency and satisfies a second frequency condition; if yes, go to Step 304; if no, go to Step 308.

Figure 3:
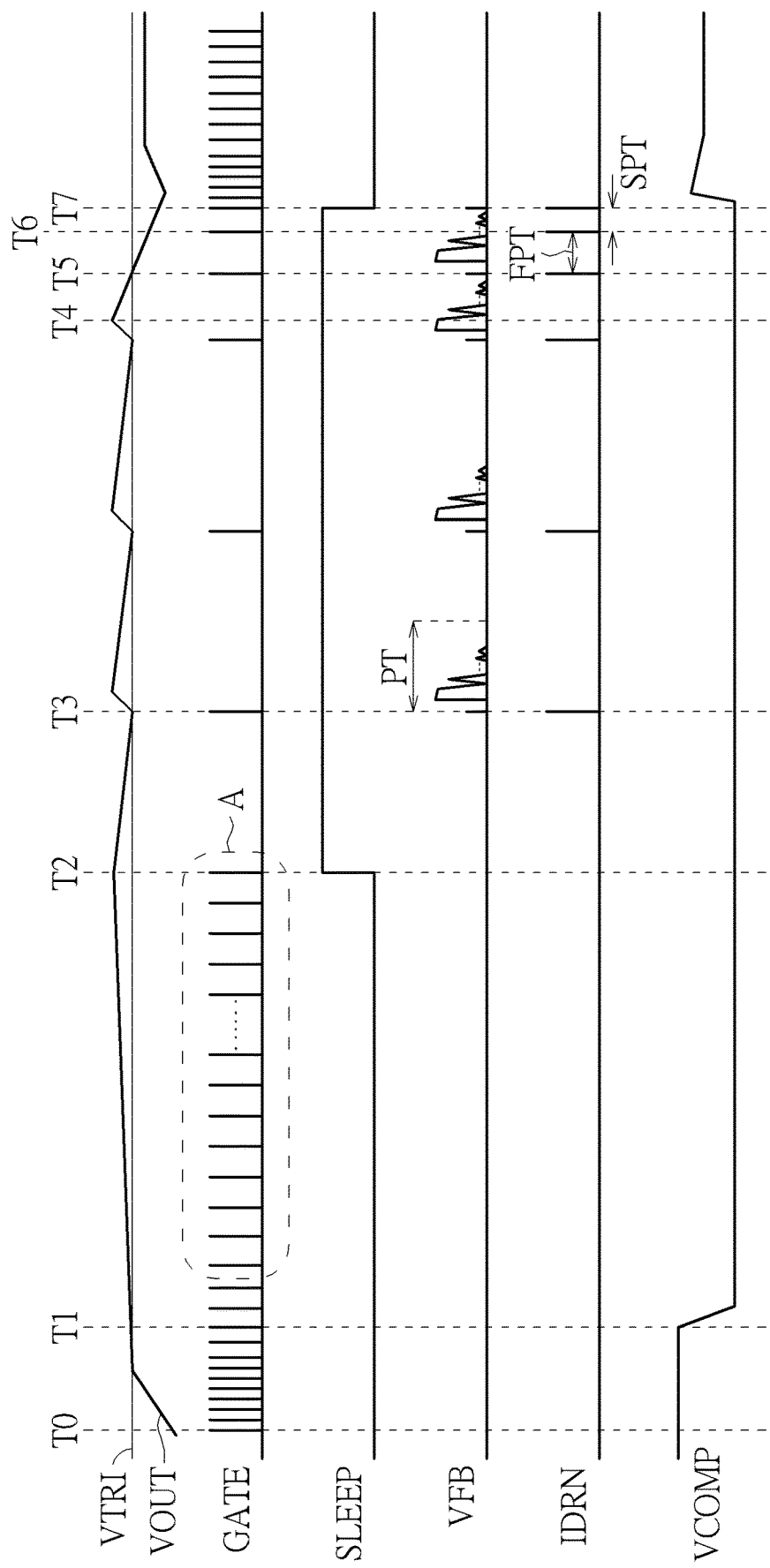
FIG. 3 is a diagram illustrating switching between the normal mode and the sleep mode of the power converter.

First, take the secondary side SEC of the power converter 100 being suddenly from no load (or light load) to heavy load as an example. Detailed descriptions are as follows:

In Step 302, please simultaneously refer to FIGS. 1, 3. At a time T0, after an alternating current power supply (not shown in FIG. 1) starts to provide an alternating voltage to the power converter 100, a rectifier (not shown in FIG. 1) of the power converter 100 can rectify the alternating voltage to generate a direct voltage VIN, wherein a supply voltage VCC is generated according to the direct voltage VIN, and the primary controller 200 starts up according to the direct voltage VIN to operate in the normal mode, that is, after the primary controller 200 starts up, the primary controller 200 is preset to operate in the normal mode. Therefore, as shown in FIG. 3, the output voltage VOUT of the secondary side SEC of the power converter 100 starts gradually to increase from the time T0. However, because the secondary side SEC of the power converter 100 has no load (or light load not shown in FIG. 1), a compensation voltage VCOMP within the primary controller 200 will be changed from high to low at a time T1 shown in FIG. 3, resulting in a frequency of a gate signal GATE controlling the power switch 208 being gradually reduced (shown in a circle A in FIG. 3).

In Step 304, the secondary controller 220 can detect the output voltage VOUT through the pin 222, and the primary controller 200 detects the operational frequency of the power converter 100. In Step 306, the first frequency condition is that the operational frequency (i.e. the frequency of the gate signal GATE) of the power converter 100 is continuously lower than the predetermined frequency (e.g. 150 Hz) for a first predetermined time (e.g. 50 ms), or the operational frequency of the power converter 100 is continuously lower than the predetermined frequency for a first predetermined number of periods (e.g. ten periods).

In Step 308, as shown in FIG. 3, at a time T2, because the operational frequency of the power converter 100 is continuously lower than the predetermined frequency for the first predetermined time, or the operational frequency of the power converter 100 is continuously lower than the predetermined frequency for the first predetermined number of periods, the primary controller 200 controls the power converter 100 to enter the sleep mode, wherein a sleep mode signal SLEEP (corresponding to the sleep mode) generated by the primary controller 200 is changed from low to high. Please further simultaneously refer to FIGS. 1, 3. After the power converter 100 enters the sleep mode, at a time T3, because the output voltage VOUT is lower than a trigger voltage VTRI, the secondary controller 220 can draw a pulse current IDRN from a drain of the synchronous switch 224 of the secondary side SEC of the power converter 100, wherein after the secondary controller 220 draws the pulse current IDRN from the drain of the synchronous switch 224, a voltage of a secondary-side winding 102 of the power converter 100 is changed with the pulse current IDRN, and voltage variety of the secondary-side winding 102 of the power converter 100 will make the feedback voltage VFB of the primary side PRI of the power converter 100 changed through an auxiliary winding NAUX of the power converter 100. When variety of the feedback voltage VFB is greater than a first reference voltage, the primary controller 200 generates the gate signal GATE to turn on the power switch 208. As shown in FIG. 3, within a predetermined time PT (e.g. 130 μs) after the power switch 208 is turned on, the primary controller 200 neglects the variety of the feedback voltage VFB to avoid detecting natural resonance of the feedback voltage VFB due to the secondary side SEC of the power converter 100 being discharged to zero. In addition, as shown in FIG. 3, because after the power converter 100 enters the sleep mode, the primary controller 200 generates the gate signal GATE only when the secondary controller 220 draws the pulse current IDRN from the drain of the synchronous switch 224, the operational frequency (i.e. the frequency of the gate signal GATE) of the power converter 100 will be reduced significantly.

In Step 310, as shown in FIG. 3, after the power converter 100 enters the sleep mode, at a time T4, the secondary side SEC of the power converter 100 is suddenly from no load (or light load) to heavy load, so the output voltage VOUT starts to be quickly reduced. As shown in FIG. 3, at a time T5, the output voltage VOUT is lower than the trigger voltage VTRI, so the secondary controller 220 draws the pulse current IDRN from the drain of the synchronous switch 224 of the secondary side SEC of the power converter 100 to make the primary controller 200 generate the gate signal GATE. As shown in FIG. 3, after the time T5, because the output voltage VOUT is continuously lower than the trigger voltage VTRI, at a time T6, the secondary controller 220 draws the pulse current IDRN from the drain of the synchronous switch 224 to make the primary controller 200 generate the gate signal GATE again, wherein a first predetermined time interval FPT (e.g. 60 μs) exists between the time T5 and the time T6. That is, between the time T5 and the time T6, although the output voltage VOUT is continuously lower than the trigger voltage VTRI, the secondary controller 220 does not draw the pulse current IDRN from the drain of the synchronous switch 224. As shown in FIG. 3, after the time T6, because the output voltage VOUT is still continuously lower than the trigger voltage VTRI, the secondary controller 220 draws the pulse current IDRN from the drain of the synchronous switch 224 each second predetermined time interval SPT (e.g. 30 has), wherein the second predetermined time interval SPT is less than the first predetermined time interval FPT. For example, at a time T7, the secondary controller 220 draws the pulse current IDRN from the drain of the synchronous switch 224, wherein the second predetermined time interval SPT exists between the time T6 and the time T7. In addition, as shown in FIG. 3, at the time T7, because a sampled value (not shown in FIG. 3)

of the feedback voltage VFB is less than a lower limit (meanwhile, for example, the output voltage VOUT is correspondingly less than the trigger voltage VTRI*96%), a compensation voltage VCOMP of the primary controller 200 will be changed from low to high to control the power converter 100 to leave the sleep mode to the normal mode (i.e. the frequency of the gate signal GATE will be increased), wherein the sleep mode signal SLEEP will also be changed from high to low accordingly. In addition, after the time T7, although the output voltage VOUT is still continuously lower than the trigger voltage VTRI, because a time interval between each two gate signals GATE is less than the first predetermined time interval FPT, the secondary controller 220 does not draw the pulse current IDRN from the drain of the synchronous switch 224.

In addition, in another embodiment of the present invention, as shown in FIG. 3, between the time T4 and the time T7, the frequency of the gate signal GATE is gradually increased (i.e. the operational frequency of the power converter 100 is gradually increased). Meanwhile, if the operational frequency of the power converter 100 is continuously higher than the predetermined frequency for a second predetermined time, or the operational frequency of the power converter 100 is continuously higher than the predetermined frequency for a second predetermined number of periods, the compensation voltage VCOMP of the primary controller 200 is also changed from low to high to control the power converter 100 to leave the sleep mode to the normal mode, wherein the second predetermined time (e.g. 40 ms) is less than the first predetermined time (e.g. 50 ms), and the second predetermined number of periods (e.g. eight periods) is also less than the first predetermined number of periods (e.g. ten periods). Because the second predetermined time is less than the first predetermined time, and the second predetermined number of periods is less than the first predetermined number of periods, a time for the power converter 100 leaving the sleep mode to the normal mode is less than a time for the power converter 100 leaving the normal mode to the sleep mode.

Figure 4:
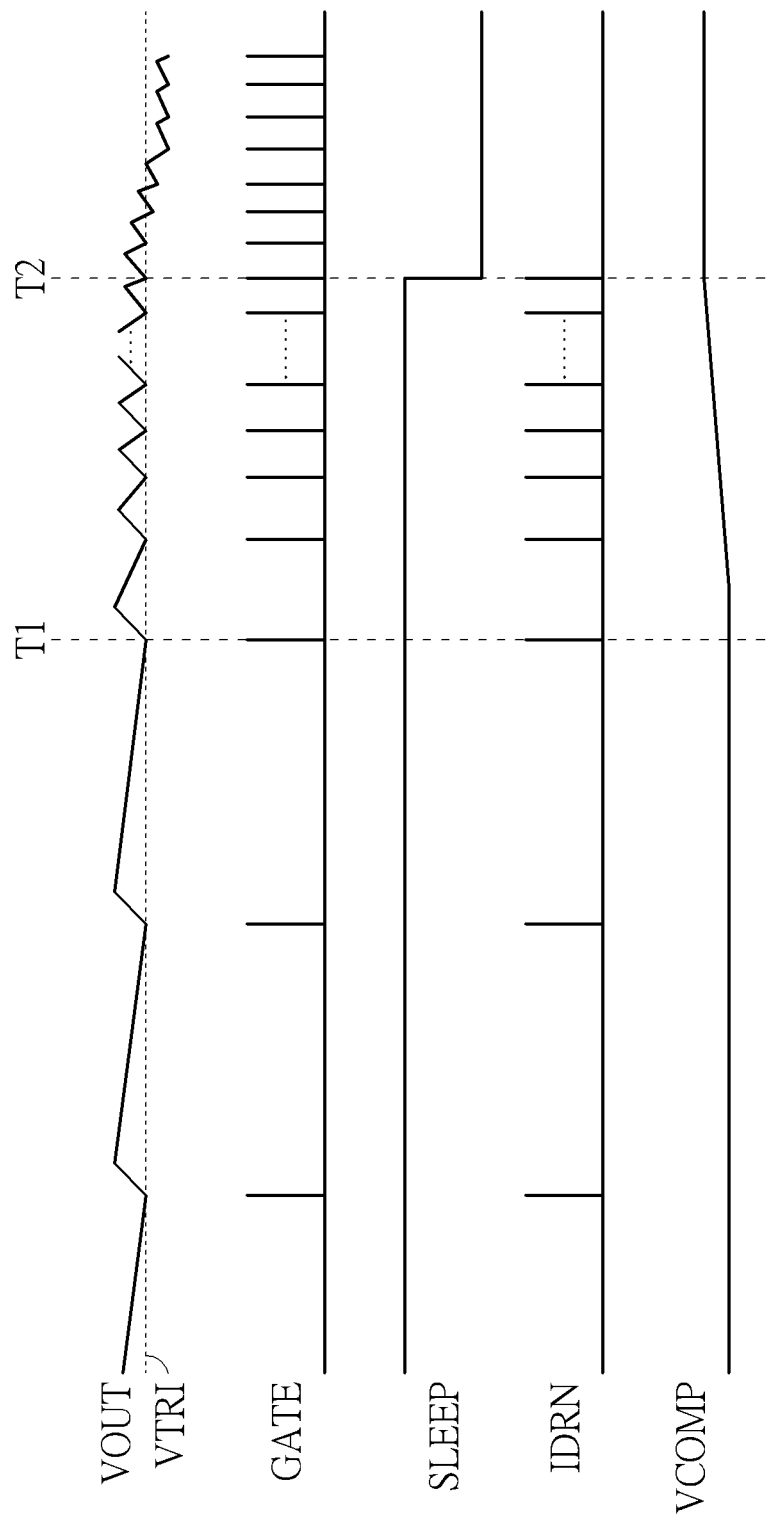
FIG. 4 is a diagram illustrating switching between the normal mode and the sleep mode of the power converter.

Further, take the secondary side SEC of the power converter 100 being gradually from no load (or light load) to heavy load and the power converter 100 operating in the sleep mode as an example. Detailed descriptions are as follows:

In Step 308, as shown in FIG. 4, before a time T1, the primary controller 200 has made the power converter 100 operate in the sleep mode, so the sleep mode signal SLEEP is high, wherein during the power converter 100 operating in the sleep mode, operational principles of the primary controller 200 and the secondary controller 220 can be referred to descriptions corresponding to FIG. 3, so further description thereof is omitted for simplicity.

In Step 310, as shown in FIG. 4, between the time T1 and a time T2, a load connected to the secondary side SEC of the power converter 100 is gradually increased, so a number of times of the output voltage VOUT being lower than the trigger voltage VTRI is also gradually increased, resulting in the frequency of the gate signal GATE being also gradually increased (i.e. the operational frequency of the power converter 100 is gradually increased). Meanwhile, as shown in FIG. 4, between the time T1 and the time T2, the compensation voltage VCOMP of the primary controller 200 is also gradually increased with increase of the load connected to the secondary side SEC of the power converter 100. As shown in FIG. 4, at the time T2, because the operational frequency of the power converter 100 is continuously higher than the predetermined frequency for the second predetermined time, or the operational frequency of the power converter 100 is continuously higher than the predetermined frequency for the second predetermined number of periods, the primary controller 200 will control the power converter 100 to leave the sleep mode to the normal mode. Meanwhile, the sleep mode signal SLEEP is changed from high to low accordingly, and the compensation voltage VCOMP is also maintained at high.

Figure 5:
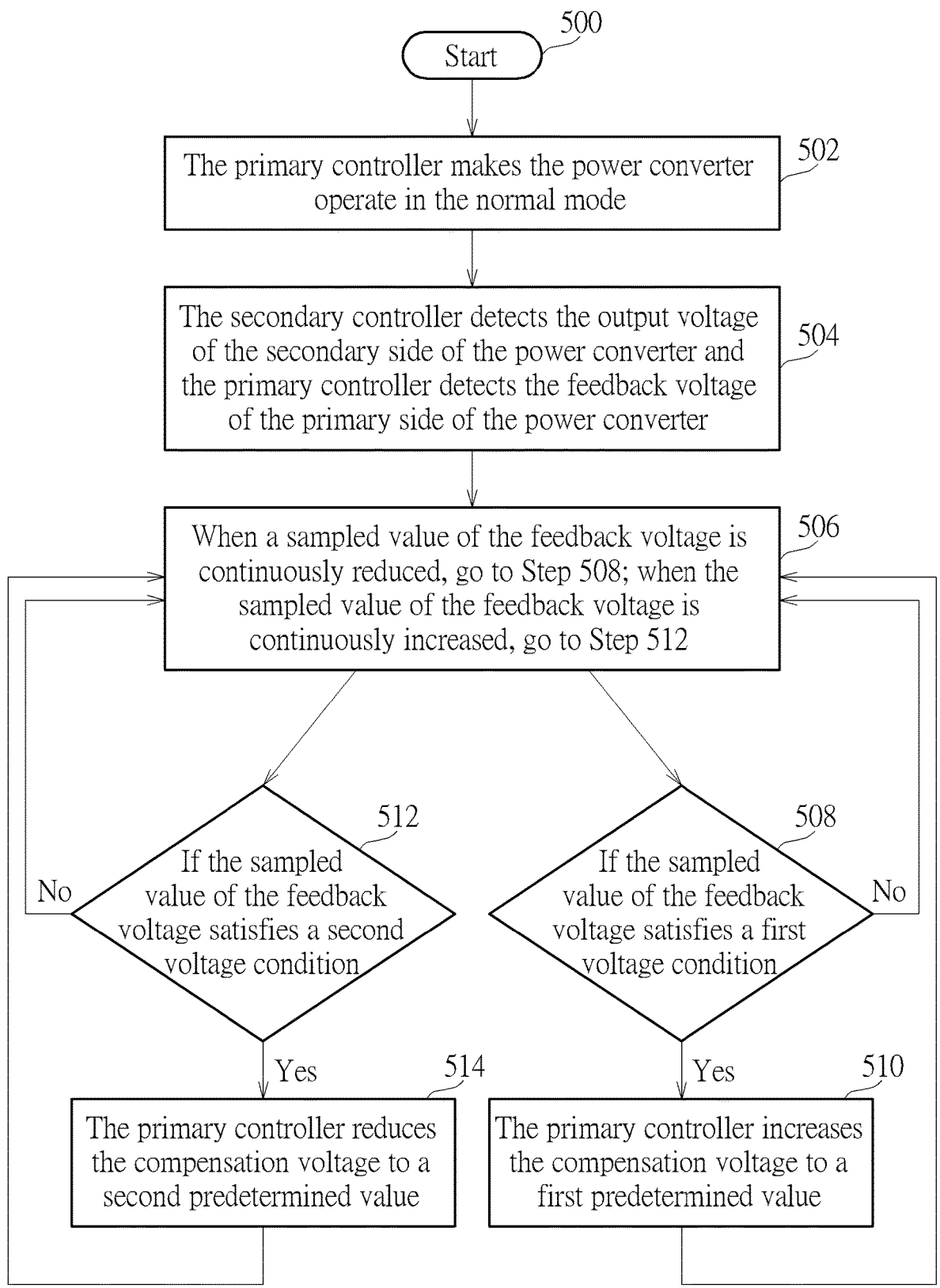
FIG. 5 is a flowchart illustrating a method of the power converter switching to a fast response mode after the power converter operates in the normal mode according to a third embodiment of the present invention.

Please refer to FIG. 5. FIG. 5 is a flowchart illustrating a method of the power converter switching to a fast response mode after the power converter operates in the normal mode according to a third embodiment of the present invention. The method in FIG. 5 is illustrated using the power converter 100, the primary controller 200, and the secondary controller 220 in FIG. 1. Detailed steps are as follows:

Step 500: Start.
Step 502: The primary controller 200 makes the power converter 100 operate in the normal mode.
Step 504: The secondary controller 220 detects the output voltage VOUT of the secondary side SEC of the power converter 100 and the primary controller 200 detects the feedback voltage VFB of the primary side PRI of the power converter 100.
Step 506: When a sampled value VFBSH of the feedback voltage VFB is continuously reduced, go to Step 508; when the sampled value VFBSH of the feedback voltage VFB is continuously increased, go to Step 512.
Step 508: If the sampled value VFBSH of the feedback voltage VFB satisfies a first voltage condition; if yes, go to Step 510; if no, go to Step 506.
Step 510: The primary controller 200 increases the compensation voltage VCOMP to a first predetermined value VCOMPH, go to Step 506.
Step 512: If the sampled value VFBSH of the feedback voltage VFB satisfies a second voltage condition; if yes, go to Step 514; if no, go to Step 506.
Step 514: The primary controller 200 reduces the compensation voltage VCOMP to a second predetermined value VCOMPL, go to Step 506.

Figure 6:
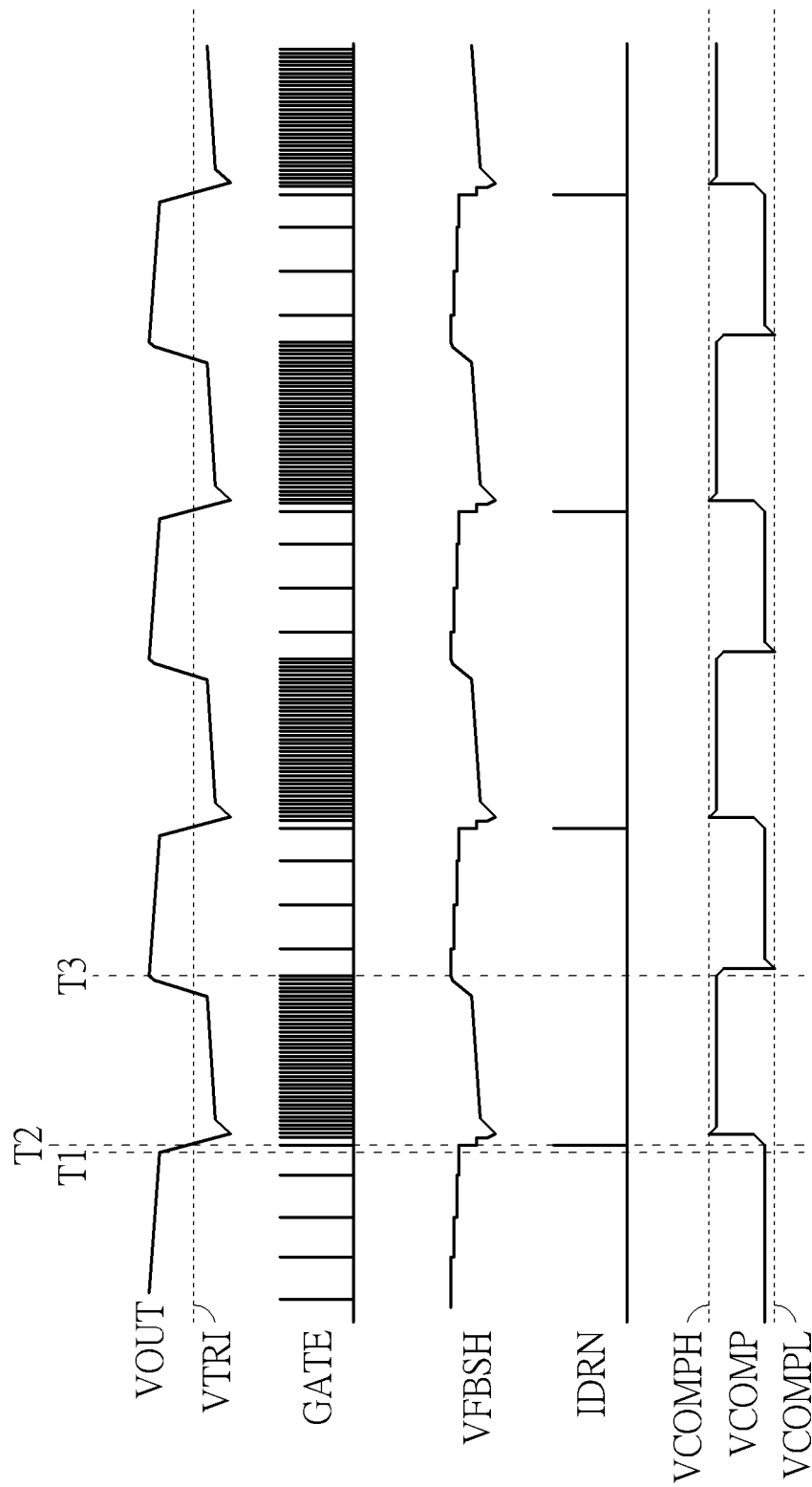
FIG. 6 is a diagram illustrating switching between the normal mode and the fast response mode of the power converter.

First, take the load connected to the secondary side SEC of the power converter 100 being dynamically changed as an example. Detailed descriptions are as follows:

In Step 504, as shown in FIG. 6, because the load connected to the secondary side SEC of the power converter 100 is dynamically changed, the output voltage VOUT and the sampled value VFBSH of the feedback voltage VFB are also changed with the load.

In Step 508, as shown in FIG. 6, before a time T1, because the load connected to the secondary side SEC of the power converter 100 is gradually increased, the output voltage VOUT and the sampled value VFBSH of the feedback voltage VFB are gradually reduced. In Step 510, as shown in FIG. 6, at a time T2, when the sampled value VFBSH of the feedback voltage VFB satisfies the first voltage condition, the primary controller 200 increases the compensation voltage VCOMP to the first predetermined value VCOMPH to control the power converter 100 to enter the fast response mode, so after the time T2, the frequency of the gate signal GATE can be quickly substantially increased from a value corresponding to the normal mode, wherein the first voltage condition is that fall velocity of the sampled value VFBSH is greater than a first predetermined velocity, or the sampled value VFBSH is less than the lower limit (meanwhile, for example, the output voltage VOUT is correspondingly less than the trigger voltage VTRI*96%). In addition, as shown in FIG. 6, at the time T2, because the output voltage VOUT is lower than the trigger voltage VTRI, the secondary controller 220 draws the pulse current IDRN from the drain of the synchronous switch 224 to make the primary controller 200 generate the gate signal GATE. In addition, as shown in FIG. 6, after the time T2, although the output voltage VOUT is still continuously lower than the trigger voltage VTRI, because the time interval between each two gate signals GATE is less than the first predetermined time interval FPT, the secondary controller 220 does not draw the pulse current IDRN from the drain of the synchronous switch 224.

In Step 512, as shown in FIG. 6, before a time T3, because the load connected to the secondary side SEC of the power converter 100 is gradually reduced, the output voltage VOUT and the sampled value VFBSH of the feedback voltage VFB are gradually increased. In Step 514, as shown in FIG. 6, at the time T3, when the sampled value VFBSH of the feedback voltage VFB satisfies the second voltage condition, the primary controller 200 reduces the compensation voltage VCOMP to the second predetermined value VCOMPL to control the power converter 100 also to enter the fast response mode, so after the time T3, the frequency of the gate signal GATE can be quickly decreased to the value corresponding to the normal mode, wherein the second voltage condition is that rising velocity of the sampled value VFBSH is greater than a second predetermined velocity, or the sampled value VFBSH is greater than an upper limit (meanwhile, for example, the output voltage VOUT is correspondingly greater than the trigger voltage VTRI*104%).

To sum up, the method of switching operational modes of the power converter provided by the present invention utilizes communication between the primary controller and the secondary controller to make the power converter enter the sleep mode and the operational frequency of the power converter substantially reduced to reduce power consumption of the power converter when the power converter operates in no load, and make the power converter enter the fast response mode when the load connected to the power converter is dynamically changed. Therefore, compared to the prior art, the present invention not only can substantially reduce power consumption of the power converter when the power converter operates in no load, but can also accelerate response of the power converter corresponding to dynamic change of the load.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of switching operational modes of a power converter, wherein a primary controller and a secondary controller are applied to the power converter, the method comprising:
   starting up the primary controller to make the power converter operate in a normal mode;
   the secondary controller detecting an output voltage of a secondary side of the power converter and the primary controller detecting an operational frequency of the power converter;
   if the operational frequency of the power converter is lower than a predetermined frequency and satisfies a first frequency condition, the primary controller controlling the power converter to enter a sleep mode; and
   when the power converter enters the sleep mode and the output voltage is lower than a trigger voltage, the secondary controller making the primary controller control the power converter to be turned on.

2. The method of claim 1, wherein the first frequency condition is that the operational frequency of the power converter is continuously lower than the predetermined frequency for a first predetermined time, or the operational frequency of the power converter is continuously lower than the predetermined frequency for a first predetermined number of periods.

3. The method of claim 1, wherein the secondary controller making the primary controller control the power converter to be turned on comprises:
   the secondary controller drawing a pulse current from a drain of a synchronous switch of the secondary side of the power converter, wherein a voltage of a secondary-side winding of the power converter is changed with the pulse current, and voltage variety of the secondary-side winding of the power converter makes a feedback voltage of a primary side of the power converter changed through an auxiliary winding of the power converter; and
   when variety of the feedback voltage is greater than a first reference voltage, the primary controller turning on a power switch of the primary side of the power converter.

4. The method of claim 3, wherein within a predetermined time after the power switch is turned on, the primary controller neglects the variety of the feedback voltage.

5. The method of claim 1, further comprising:
   after the power converter enters the sleep mode, if the operational frequency of the power converter is higher than the predetermined frequency and satisfies a second frequency condition, the primary controller controlling the power converter to leave the sleep mode.

6. The method of claim 5, wherein the second frequency condition is that the operational frequency of the power converter is continuously higher than the predetermined frequency for a second predetermined time, or the operational frequency of the power converter is continuously higher than the predetermined frequency for a second predetermined number of periods.

7. The method of claim 1, further comprising:
   after the power converter enters the sleep mode, if a sampled value of a feedback voltage of a primary side of the power converter is less than a lower limit, the primary controller controlling the power converter to leave the sleep mode.

8. The method of claim 1, further comprising:
   during the power converter operating in the normal mode, the primary controller detecting a feedback voltage of a primary side of the power converter;
   if a sampled value of the feedback voltage satisfies a first voltage condition or a second voltage condition, the primary controller controlling the power converter to enter a fast response mode.

9. The method of claim 8, wherein the first voltage condition is that when a fall velocity of the sampled value of the feedback voltage is greater than a first predetermined velocity, or the sampled value of the feedback voltage is less than a lower limit, the primary controller increases a compensation voltage to a first predetermined value to make the power converter enter the fast response mode.

10. The method of claim 8, wherein the second voltage condition is that when a rising velocity of the sampled value of the feedback voltage is greater than a second predetermined velocity, or the sampled value of the feedback voltage is greater than an upper limit, the primary controller reduces a compensation voltage to a second predetermined value to make the power converter enter the fast response mode.

* * * * *